United States Patent
Kenyon et al.

(10) Patent No.: US 8,909,877 B2
(45) Date of Patent: Dec. 9, 2014

(54) DYNAMIC REAL STORAGE USAGE CONTROL

(75) Inventors: Jerome P. Kenyon, San Jose, CA (US); Nigel G. Slinger, Los Gatos, CA (US); John B. Tobler, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 13/365,042

(22) Filed: Feb. 2, 2012

(65) Prior Publication Data

US 2013/0205101 A1 Aug. 8, 2013

(51) Int. Cl.
G06F 12/00 (2006.01)

(52) U.S. Cl.
USPC .......................................... 711/154; 711/159

(58) Field of Classification Search
None
See application file for complete search history.

(56) References Cited

U.S. PATENT DOCUMENTS

| | | | |
|---|---|---|---|
| 5,321,832 A | | 6/1994 | Tanaka et al. |
| 2002/0059260 A1* | | 5/2002 | Jas .................................. 707/100 |
| 2005/0091266 A1* | | 4/2005 | Hasegawa .................. 707/103 R |
| 2008/0320211 A1* | | 12/2008 | Kinoshita ...................... 711/103 |
| 2011/0022642 A1 | | 1/2011 | deMilo et al. |
| 2011/0047204 A1 | | 2/2011 | Mansoor et al. |
| 2011/0179162 A1 | | 7/2011 | Mayo et al. |
| 2011/0179233 A1 | | 7/2011 | Golbourn |

OTHER PUBLICATIONS

IBM Corp., "IBM OA35885: Current Real and Auxiliary Storage Usage Information is not Available for High Virtual Storage", [online], [Retrieved on Feb. 2, 2012]. Retrieved from the Internet at <URL: http://www-01.ibm.com/support/docview.wss?uid=isg1OA35885>, Total 8 pp.

Mell, P. and T. Grance, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", National Institute of Standards and Technology, Jan. 2011, Total 7 pp.

Mikkilineni, R., Dr. and V. Sarathy, "Cloud Computing and the Lessons from the Past", 2009, 18th IEEE International Workshops on Enabling Technologies: Infrastructures for Collaboration Enterprises (WETICE), Total 6 pp. [Also pp. 57-62].

* cited by examiner

*Primary Examiner* — Matthew Bradley
*Assistant Examiner* — Daniel Tsui
(74) *Attorney, Agent, or Firm* — Janaki K. Davda; Konrad, Raynes, Davda & Victor LLP

(57) ABSTRACT

Provided are techniques for managing an amount of real storage used by a database management system. A value of a real storage management parameter is received, wherein the real storage management parameter indicates conditions under which one or more virtual storage pages are analyzed to identify one or more unused, virtual storage pages that are to be discarded. The database management system and consumption of real storage and auxiliary storage is monitored. In response to determining that the value of the real storage management parameter is set to on, the one or more unused virtual storage pages are discarded. In response to determining that the value of the real storage management parameter is set to auto and that paging has occurred, the one or more unused, virtual storage pages are discarded. Health values are recorded.

19 Claims, 8 Drawing Sheets

DYNAMIC REAL STORAGE USAGE CONTROL

FIELD

Embodiments of the invention relate to dynamic real storage usage control (e.g., for online database management systems).

BACKGROUND

Real storage may be described as physical storage for storing data. Real storage includes Random Access Memory (RAM) and auxiliary storage. In particular, when RAM is exhausted, files on disk are used. These files are referred to as auxiliary storage. The paging files are referred to as auxiliary storage. Thus, the total real storage is RAM plus auxiliary storage. Virtual storage may be described as multiple, different physical storages that are treated as one "virtual" storage that is directly addressable so that applications can treat all of the designated storages as one addressable storage. An application may be assigned a range of virtual storage addresses (typically 32-bits or 64-bits of addressable storage).

Storage is typically divided into 4K pages. When a given virtual storage page in virtual storage is accessed, a 4K real frame is allocated to house (or back) the data. Thus, a real frame backs each 4K virtual storage page in use.

As database management systems adopt 64-bit addressing to alleviate virtual storage constraints, real storage constraints become an important scaling factor. A technique to bound and control real storage usage has been developed for online database management systems. By controlling real storage demand, available real storage can be maximally shared amongst multiple online database management systems and limit the potential for one database management system to negatively affect the performance of other processes via over consumption of real storage, while at the same time eliminating the need to greatly over-provision real storage. Over consumption of real storage can affect application performance due to paging. In some cases, the operating system image may fail if all auxiliary storage is consumed by an excessive demand for real frames. Thus, controlling real storage consumption is useful for database management system performance and availability.

This is useful in cloud configurations when multiple database management systems are deployed on a single operating system image and have Quality Of Service (QOS) expectations. Database management systems deployed in a cloud configuration typically desire to operate without hindrance from other applications. Cloud QOS guarantees cannot be achieved without the mechanisms to control and manage real storage consumption on a database management system/application level.

Some conventional systems limit real storage at an address space level. However, the limit would not apply to the entire database management system. Limiting real storage at the address space level is typically for applications that use multiple address spaces (or processes). For example, for an application that is limited to three address spaces, the real storage limits apply as the sum of the three address spaces, rather than imposing the real storage limits per address space. In some cases, for more complex applications involving multiple address spaces, a single address space limit is not sufficient. In addition, any common or shared storage is not accounted for or is inaccurately accounted for as it is difficult to determine which address space should be charged for the storage usage.

Some conventional systems limit virtual storage in an operating environment (e.g., a JAVA® Virtual Machine (JVM)) or an address space level. (JAVA is a trademark of Oracle Corporation registered in many jurisdictions worldwide.) However, the amount of real storage used does not correlate well to the amount of virtual storage allocated.

SUMMARY

Provided are a method, computer program product, and system for managing an amount of real storage used by a database management system. A value of a real storage management parameter is received, wherein the real storage management parameter indicates conditions under which one or more virtual storage pages are analyzed to identify one or more unused, virtual storage pages that are to be discarded. The database management system and consumption of real storage and auxiliary storage is monitored. In response to determining that the value of the real storage management parameter is set to on, the one or more unused, virtual storage pages are discarded. In response to determining that the value of the real storage management parameter is set to auto, it is determined whether paging has occurred, and, in response to determining that paging has occurred, the one or more unused, virtual storage pages are discarded. Health values are recorded.

BRIEF DESCRIPTION OF THE SEVERAL VIEWS OF THE DRAWINGS

Referring now to the drawings in which like reference numbers represent corresponding parts throughout:

FIG. 6 is formed by FIGS. 6A, 6B, and 6C.

DETAILED DESCRIPTION

Figure 1:
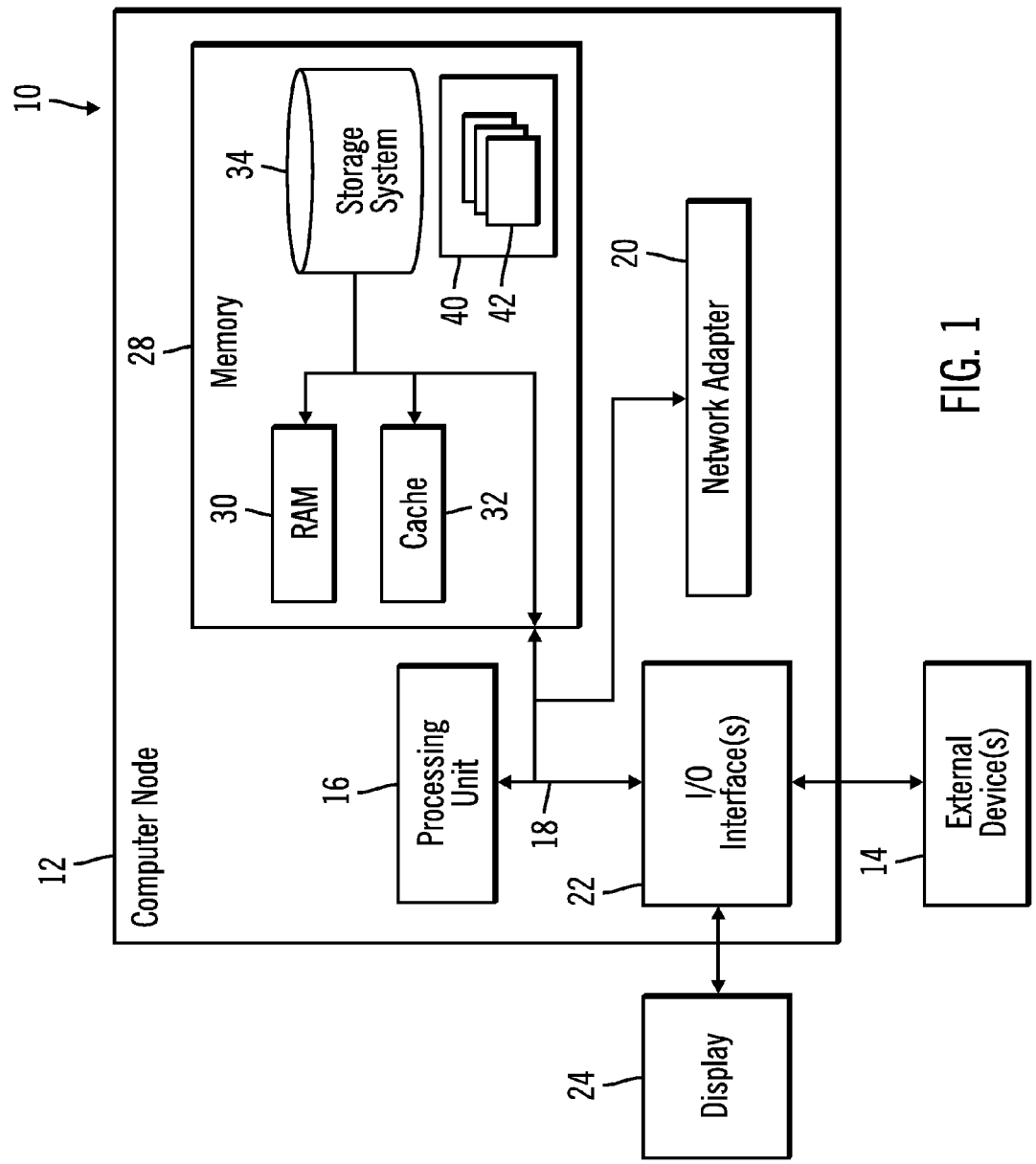
FIG. 1 depicts a cloud computing node in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
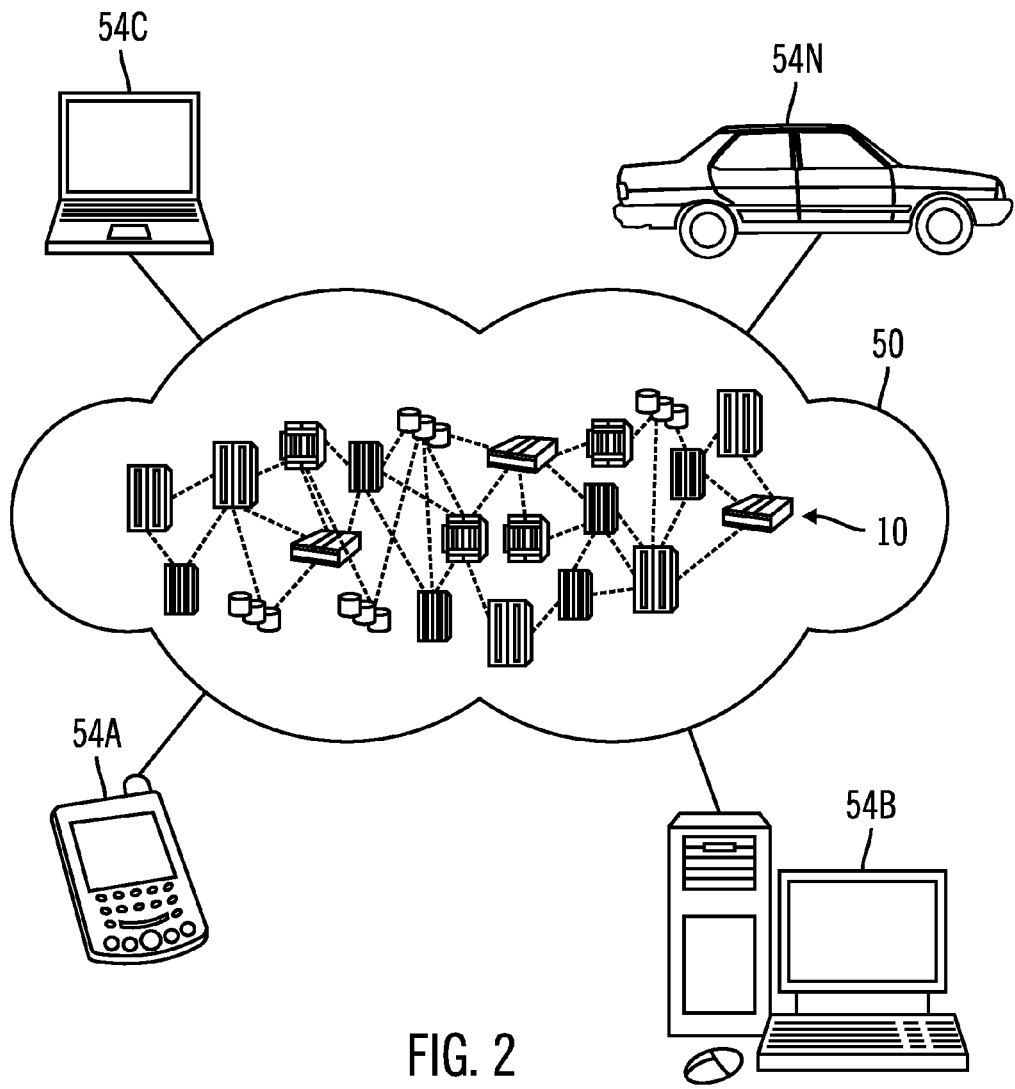
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
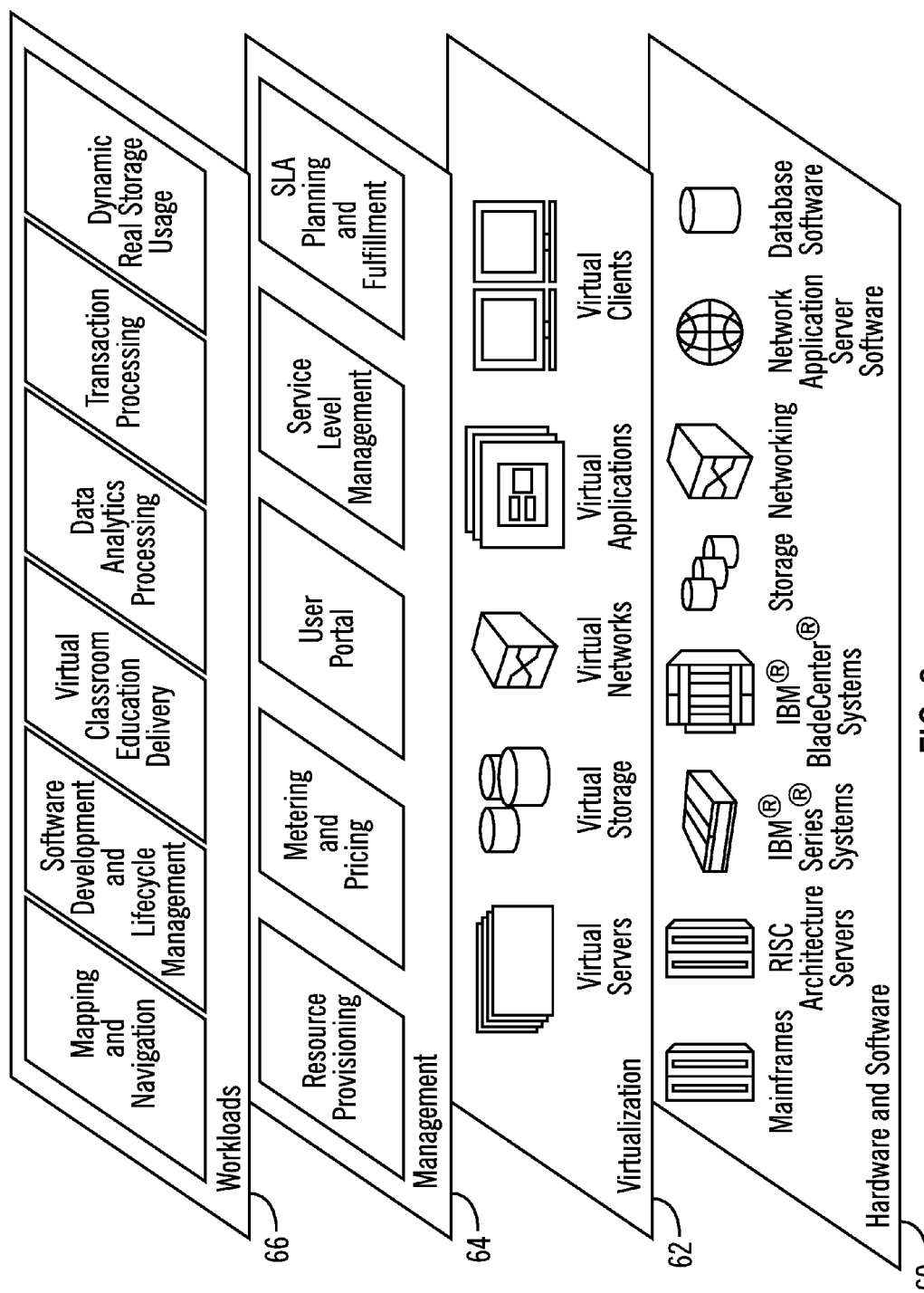
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dynamic real storage usage.

Thus, in certain embodiments, software, implementing dynamic real storage usage in accordance with embodiments described herein, is provided as a service in a cloud environment.

Figure 4:
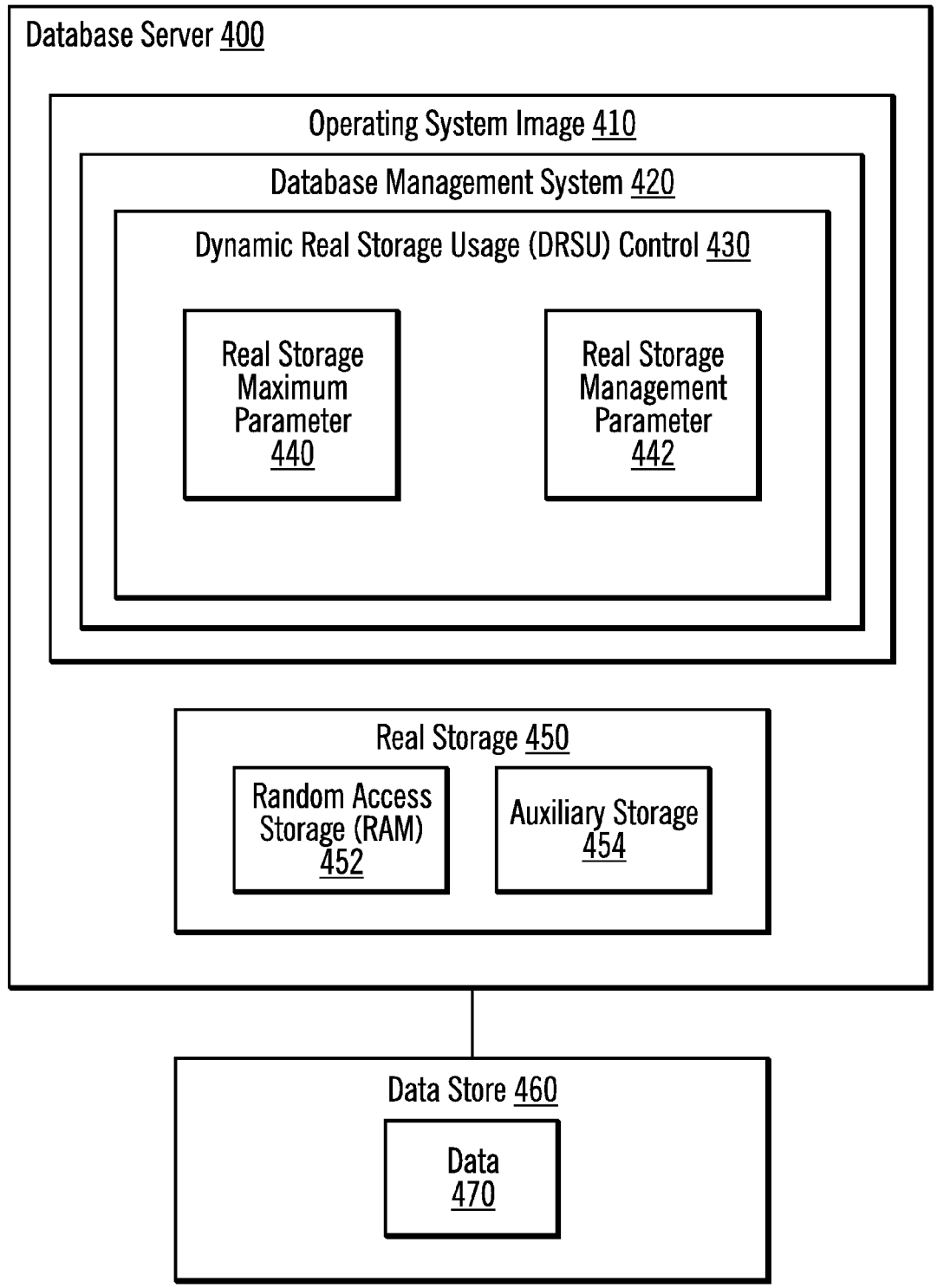
FIG. 4 illustrates a computing environment in accordance with certain embodiments.

FIG. 4 illustrates, in a block diagram, a computing environment in accordance with certain embodiments. A database server 400 includes an Operating System (OS) image 410 and real storage 450. The OS image 410 includes a database management system 420 (i.e., an application). In certain embodiments, the database management system 420 has multiple related address spaces. The database management system 420 includes a Dynamic Real Storage Usage (DRSU) control 430. The DRSU control 430 includes a real storage maximum parameter 440 and a real storage management parameter 442. The real storage 450 includes RAM 452 and auxiliary storage 454. The database server 400 is coupled to a data store 460, which stores data 470. In certain embodiments, the database server 400 is a database server, and the data store 460 is a database.

The real storage 450 may be described as a finite resource managed by the OS and consumed by applications running on that OS.

The real storage maximum parameter 440 and the real storage management parameter 442 are two configuration parameters that are used to control real storage consumption at the online database management system level. The real storage maximum parameter 440 and the real storage management parameter 442 may be described as dynamic database management system configuration parameters.

Figure 5:
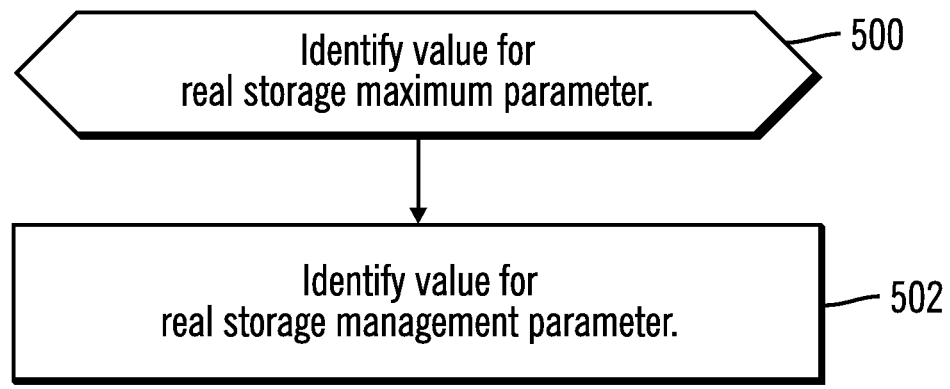
FIG. 5 illustrates, in a flow diagram, operations performed by a DRSU control to set parameter values in accordance with certain embodiments.

FIG. 5 illustrates, in a flow diagram, operations performed by the DRSU control 430 to set parameter values in accordance with certain embodiments.

In certain embodiments, the real storage maximum parameter 440 and the real storage management parameter 442 may be set in the database management system 420 at startup of the database management system 420. In certain embodiments, an online change via a command issued to the database management system 420 is provided.

Control begins at block 500 with the DRSU control 430 identifying a value for the real storage maximum parameter 440. The real storage maximum parameter 440 defines the maximum database management system-wide amount of real and auxiliary storage allowed to be consumed by the database management system 420. This includes private storage across multiple address spaces, shared storage, and common storage. This is a hard maximum, and, if the database management system 420 attempts to surpass that level, the database management system 420 will self-terminate. This allows for 1) accurate real storage capacity planning to be done, and 2) avoids a failure of the operating system image 410 due to real storage overuse due to demand or programming error.

In block 502, the DRSU control 430 identifying a value for the real storage management parameter 442. The real storage management parameter 442 indicates the conditions under which virtual storage pages should be analyzed to see if they no longer require backing by real storage (i.e., unbacked). That is, the real storage management parameter 442 indicates conditions under which one or more virtual storage pages are analyzed to identify one or more unused, virtual storage pages that are to be discarded. These unused, virtual storage pages may be said to be unbacked. Unbacking a virtual storage page may be described as the virtual storage page no longer having a corresponding 4K real frame in real storage. The data for that virtual storage page is gone and will be zeroes if addressed in the future. This allows having a large virtual object, without needing a real frame to back each 4K page within that larger virtual object. Although examples may refer to a 4K virtual storage page and/or a 4K real frame, embodiments works with any virtual storage page and real frame size is being used in a given environment (e.g., sizes of 1 Million bytes (1M) and 2 Gigabytes (2 G)). The options for real storage management parameter 442 are on, off, and auto. These are described in further detail with reference to FIG. 6.

In certain embodiments, the real storage maximum parameter 440 and the real storage management parameter 442 may be set independently of each other.

In certain embodiments, there is a value for a threshold percentage (e.g., 80%) of the real storage maximum parameter 440. In certain embodiments, the threshold percentage of the real storage maximum parameter 440 is a variable that is set based on memory capacity and database management system processing power. In certain embodiments, the threshold percentage is a constant defined within the database management system 420.

Figure 6A:
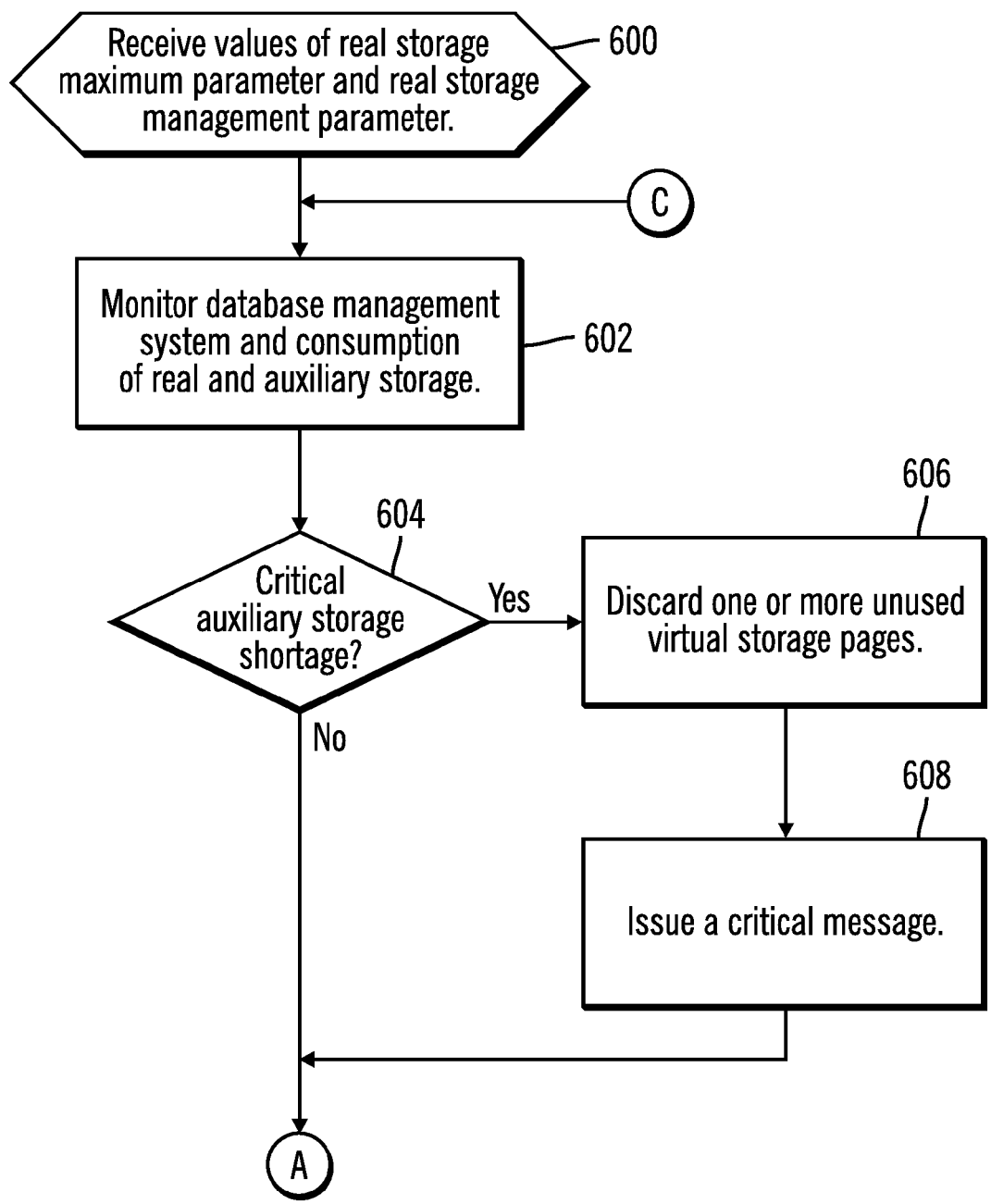
FIG. 6 illustrates, in a flow diagram, operations performed by a DRSU control to manage real storage using parameter values in accordance with certain embodiments.
Figure 6B:
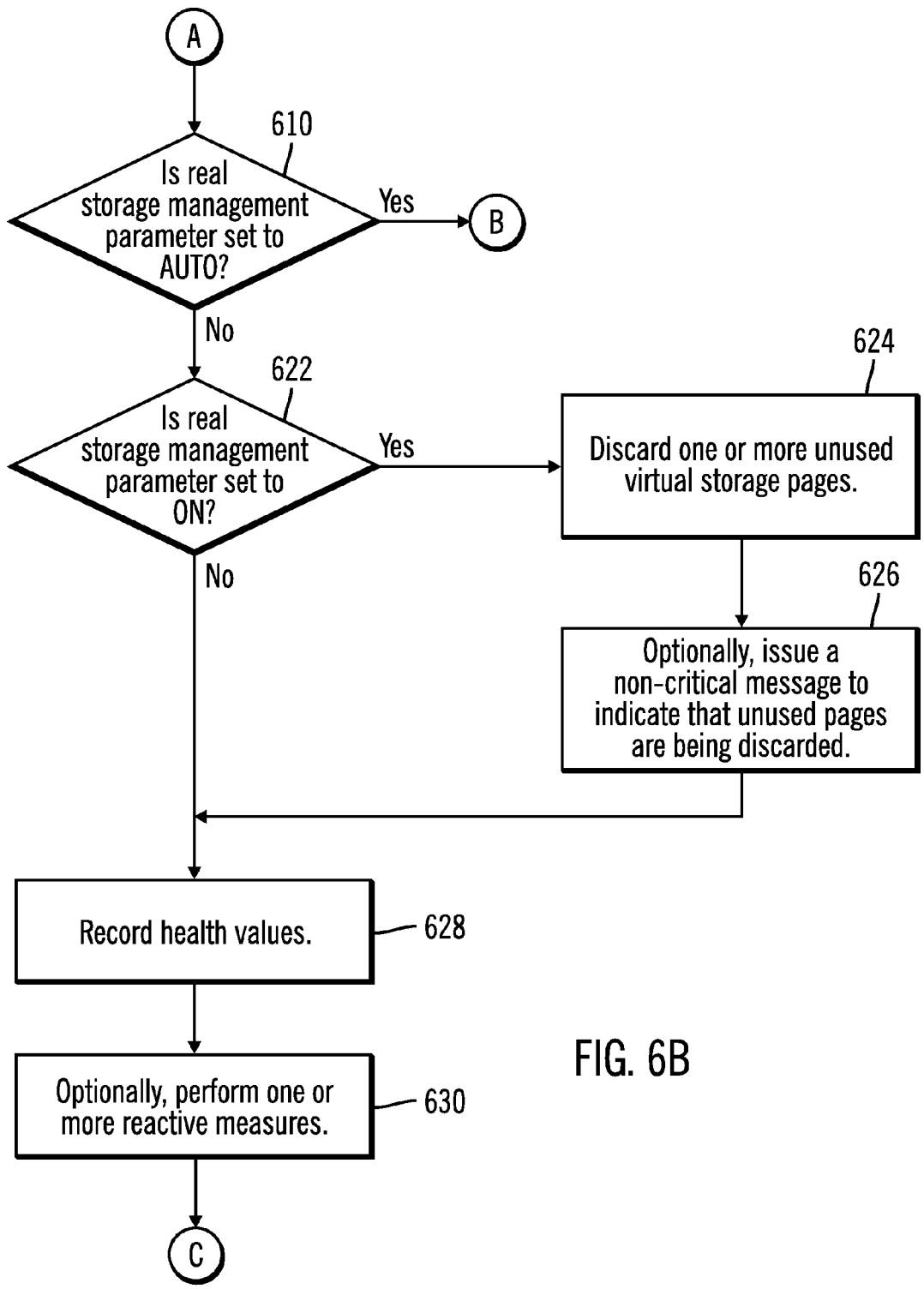
Figure 6C:
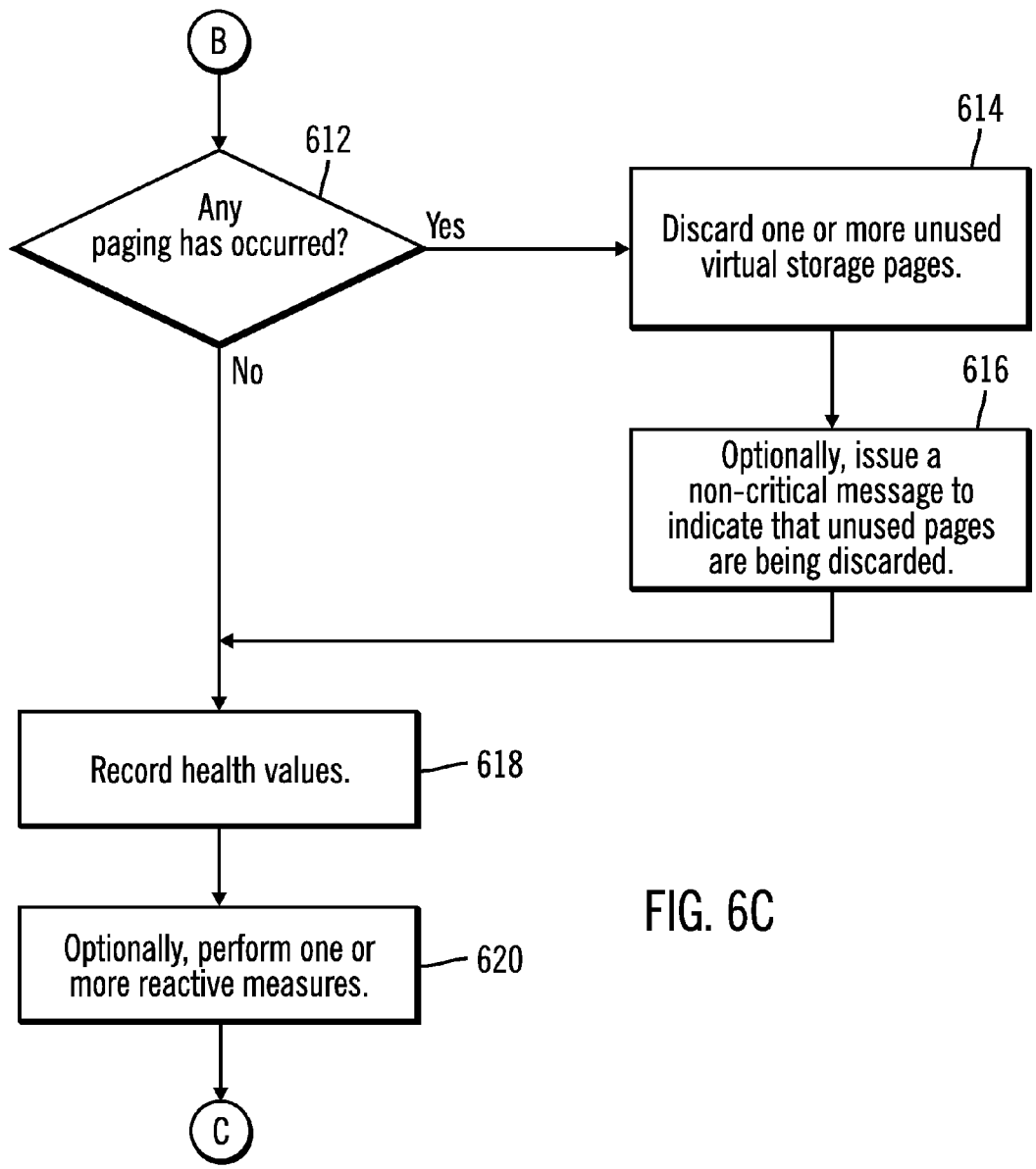

FIG. 6 illustrates, in a flow diagram, operations performed by the DRSU control 430 to manage real storage using parameter values in accordance with certain embodiments. FIG. 6 is formed by FIGS. 6A, 6B, and 6C.

Control begins at block 600 with the DRSU control 430 receiving values of the real storage maximum parameter 440 and the real storage management parameter 442. In block 602, the DRSU control 430 monitors the database management system 420, consumption of real storage, and consumption of auxiliary storage. In block 604, the DRSU control 430 determines whether there is a critical auxiliary storage shortage. If so, processing continues to block 606, otherwise, processing continue to block 610 (FIG. 6B).

In certain embodiments, a critical auxiliary storage shortage indicates that 1) the operating system 410 has nearly exceeded the aggregate amount of real storage available (real and auxiliary frames) or 2) the database management system 420 has consumed an amount of storage meeting or exceeding the threshold percentage of the real storage maximum parameter 440 (i.e., a large percentage of storage defined by the real storage maximum parameter 440 (e.g., 80%)).

In block 606, the DRSU control 430 discards one or more unused, virtual storage pages. Discarding one or more unused, virtual storage pages may be described as unbacking one or more virtual storage pages that have been paged into the real storage 450, but that are currently not in use. In block 608, the DRSU control 430 issues a critical message. The critical message indicates that unused pages are being discarded. Moreover, if the reason for the critical auxiliary storage shortage is that the database management system 420 has consumed an amount of storage meeting or exceeding the threshold percentage of the real storage maximum parameter 440, the critical message indicates that the real storage maximum is being approached. From block 608, processing continues to block 610 (FIG. 6B). In certain embodiments, the critical message may be a highlighted console message.

In block 608, the DRSU control 430 determines whether the real storage management parameter 442 is set to auto. If so, processing continues to block 612 (FIG. 6C), otherwise, processing goes to block 620.

In block 612, the DRSU control 430 determines whether any paging has occurred. If so, processing continues to block 614, otherwise, processing continues to block 618. In block 614, the DRSU control 430 discards one or more unused, virtual storage pages. In block 616, the DRSU control 616, optionally, issues a non-critical message to indicate that one or more unused, virtual storage pages are being discarded. In block 618, the DRSU control 430 records health values. In certain embodiments, for the health values, real and auxiliary storage values for each address space for the database management system 420, an overall system health value based on real storage and auxiliary storage consumption (e.g., in a range of 1-5), and values for the real storage maximum parameter 440 and real storage management parameter 442 are recorded for later analysis. In block 620, the DRSU control 430, optionally, performs one or more reactive measures. From block 620, processing loops back to block 602 (FIG. 6A) to continue monitoring.

In block 622, the DRSU control determines whether the real storage management parameter 442 is set to on. If so, processing continues to block 624, otherwise, processing continues to block 628. In block 624, the DRSU control 430 discards one or more unused, virtual storage pages. In block 626, the DRSU control 616, optionally, issues a non-critical message to indicate that one or more unused, virtual storage pages are being discarded. From block 626, processing continues to block 628.

If the real storage management parameter 442 is set to off, processing goes through blocks 610 and 622 to block 628. In block 628, the DRSU control 430 records health values. In block 630, the DRSU control 430, optionally, performs one or more reactive measures. From block 630, processing loops back to block 602 (FIG. 6A) to continue monitoring.

In certain embodiments, the critical and non-critical messages may be sent to one or more database management system administrators and online monitors (e.g., via console messages or other means). Thus, whether the real storage management parameter 442 is set to on, off or auto, if a virtual storage page is unbacked, a message is sent.

By notifying administrators and leaving an audit trail, action may be taken to adjust the real storage maximum parameter 440 and the real storage management parameter 442 as both are dynamic configuration parameters.

In certain embodiments, the DRSU control 430, optionally, takes other reactive measures. Example of reactive measures include:

1) Throttling a degree of query parallelism in the face of real storage limits. This limits the number of active database agents and limits the overall storage footprint of the database management system 420.

2) Limiting new database threads, either through rejection or queueing, to decrease new demand for real storage.

3) Using adaptive algorithms to control the dynamic parameters 440, 442 based on database management system and workload conditions.

4) Selectively suspending or terminating database threads that are large real storage consumers based on past behavior of the same application.

5) Using an adaptive unbacking algorithm to select one or more virtual storage pages for unbacking With this, certain cached virtual storage pages may be more important than others to database management system performance and unbacking of such virtual storage pages could be deferred until a severe real storage shortage is detected.

While the real storage management parameter 442 can be used to smooth real storage consumption by using the on and auto options, the goal is to bound the database management system 420 to the value set in real storage maximum parameter 440. The synergy between the two parameters 440, 442 provides additional resiliency. The use of a threshold percentage below the hard limit allows the storage management to work in a somewhat predictive manner. Also, the dynamic nature of the parameters 440, 442 allows for adaptive setting in response to differing database management system conditions and workloads.

The DRSU control 430 allows for multiple online database management systems 420 to be installed on a single operating system image 410 and share real storage resources in a controlled fashion without the need for excessive provisioning of real storage.

Thus, the real storage maximum parameter 440 is a dynamic database management system 420 parameter that is set to control a maximum amount of real storage an entire database management system 420 (i.e., multiple related address spaces) is allowed to consume.

With the real storage maximum parameter 440 and the real storage management parameter 442, the DRSU control 430 controls real storage consumption across the multiple related address spaces (i.e., across the entire database management system 420. The DRSU control 430 accurately charges real storage consumed by common and shared objects to the entire database management system 420.

The DRSU control 430 enables virtual storage limits to be set appropriately high so full advantage can be taken of 64-bit addressing ranges.

Also, the DRSU control 430 enables adaptive algorithms to be applied to provide optimal utilization and performance in reaction to workload changes.

The DRSU control 430 may be used with any application, and, the DRSU control 430 is especially useful for multi-process applications or applications using common/shared memory across address spaces (processes).

The DRSU control 430 enables finer grained tracking/charging of memory use to applications that demand resources through a shared service (e.g., a database server) that allocates those resources.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape, any other storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5 and 6 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for managing an amount of real storage used by a database management system, comprising:
    receiving, with a processor of a computer, a value of a real storage management parameter, wherein the real storage management parameter indicates conditions under which one or more virtual storage pages are analyzed to identify one or more unused, virtual storage pages that are to be discarded; and
    while monitoring the database management system and consumption of real storage and auxiliary storage,
        in response to determining that the value of the real storage management parameter is set to on, discarding the one or more unused, virtual storage pages;
        in response to determining that the value of the real storage management parameter is set to auto,
            determining whether paging has occurred; and
            in response to determining that paging has occurred, discarding the one or more unused, virtual storage pages; and
        recording health values.

2. The method of claim 1, further comprising:
receiving a value for a real storage maximum parameter, wherein the real storage maximum parameter defines a maximum, database management system-wide amount of real and auxiliary storage allowed to be consumed by the database management system.

3. The method of claim 2, further comprising:
adjusting values for at least one of the real storage management parameter and the real storage maximum parameter.

4. The method of claim 1, further comprising:
determining that there is a critical auxiliary storage shortage; and
discarding the one or more unused, virtual storage pages.

5. The method of claim 1, further comprising:
in response to discarding the one or more unused, virtual storage pages, issuing a message to a system administrator.

6. The method of claim 1, further comprising:
performing one or more reactive measures.

7. The method of claim 1, wherein software is provided as a service in a cloud environment.

8. A computer system for an amount of real storage used by a database management system, comprising:
    a processor; and
    a storage device connected to the processor, wherein the storage device has stored thereon a program, and wherein the processor is configured to execute instructions of the program to perform operations, wherein the operations comprise:
    receiving a value of a real storage management parameter, wherein the real storage management parameter indicates conditions under which one or more virtual storage pages are analyzed to identify one or more unused, virtual storage pages that are to be discarded; and
    while monitoring the database management system and consumption of real storage and auxiliary storage,
        in response to determining that the value of the real storage management parameter is set to on, discarding the one or more unused, virtual storage pages;
        in response to determining that the value of the real storage management parameter is set to auto,
            determining whether paging has occurred; and
            in response to determining that paging has occurred, discarding the one or more unused, virtual storage pages; and
        recording health values.

9. The computer system of claim 8, wherein the operations further comprise:
receiving a value for a real storage maximum parameter, wherein the real storage maximum parameter defines a maximum, database management system-wide amount of real and auxiliary storage allowed to be consumed by the database management system.

10. The computer system of claim 9, wherein the operations further comprise:
adjusting values for at least one of the real storage management parameter and the real storage maximum parameter.

11. The computer system of claim 8, wherein the operations further comprise:
   determining that there is a critical auxiliary storage shortage; and
   discarding the one or more unused, virtual storage pages.

12. The computer system of claim 8, wherein the operations further comprise:
   in response to discarding the one or more unused, virtual storage pages, issuing a message to a system administrator.

13. The computer system of claim 8, wherein the operations further comprise:
   performing one or more reactive measures.

14. A computer program product for an amount of real storage used by a database management system, the computer program product comprising:
   a non-transitory computer readable storage medium having computer readable program code embodied therewith, the computer readable program code comprising:
   computer readable program code, when executed by a processor of a computer, configured to perform operations of:
   receiving a value of a real storage management parameter, wherein the real storage management parameter indicates conditions under which one or more virtual storage pages are analyzed to identify one or more unused, virtual storage pages that are to be discarded; and
   while monitoring the database management system and consumption of real storage and auxiliary storage,
      in response to determining that the value of the real storage management parameter is set to on, discarding the one or more unused, virtual storage pages;
      in response to determining that the value of the real storage management parameter is set to auto,
         determining whether paging has occurred; and
         in response to determining that paging has occurred, discarding the one or more unused, virtual storage pages; and
         recording health values.

15. The computer program product of claim 14, wherein the computer readable program code, when executed by the processor of the computer, is configured to perform operations of:
   receiving a value for a real storage maximum parameter, wherein the real storage maximum parameter defines a maximum, database management system-wide amount of real and auxiliary storage allowed to be consumed by the database management system.

16. The computer program product of claim 15, wherein the computer readable program code, when executed by the processor of the computer, is configured to perform operations of:
   adjusting values for at least one of the real storage management parameter and the real storage maximum parameter.

17. The computer program product of claim 14, wherein the computer readable program code, when executed by the processor of the computer, is configured to perform operations of:
   determining that there is a critical auxiliary storage shortage; and
   discarding the one or more unused, virtual storage pages.

18. The computer program product of claim 14, wherein the computer readable program code, when executed by the processor of the computer, is configured to perform operations of:
   in response to discarding the one or more unused, virtual storage pages, issuing a message to a system administrator.

19. The computer program product of claim 14, wherein the computer readable program code, when executed by the processor of the computer, is configured to perform operations of:
   performing one or more reactive measures.

* * * * *